United States Patent
Yang et al.

(10) Patent No.: US 11,737,025 B2
(45) Date of Patent: Aug. 22, 2023

(54) POWER-SAVING SIGNAL TRANSMISSION METHOD, POWER-SAVING SIGNAL RECEPTION METHOD, BASE STATION AND TERMINAL

(71) Applicant: DATANG MOBILE COMMUNICATIONS EQUIPMENT CO., LTD., Beijing (CN)

(72) Inventors: Meiying Yang, Beijing (CN); Deshan Miao, Beijing (CN); Fangchen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 232 days.

(21) Appl. No.: 17/058,070

(22) PCT Filed: Apr. 15, 2019

(86) PCT No.: PCT/CN2019/082652
§ 371 (c)(1),
(2) Date: Nov. 23, 2020

(87) PCT Pub. No.: WO2019/233188
PCT Pub. Date: Dec. 12, 2019

(65) Prior Publication Data
US 2021/0204216 A1    Jul. 1, 2021

(30) Foreign Application Priority Data
Jun. 4, 2018    (CN) .......................... 201810565355.3

(51) Int. Cl.
*H04W 52/02*    (2009.01)
*H04W 24/10*    (2009.01)
(Continued)

(52) U.S. Cl.
CPC ....... *H04W 52/0235* (2013.01); *H04W 24/10* (2013.01); *H04W 52/0258* (2013.01)

(58) Field of Classification Search
CPC ............. H04W 52/0235; H04W 24/10; H04W 52/0258
(Continued)

(56) References Cited

U.S. PATENT DOCUMENTS

2010/0008278 A1    1/2010  Kone et al.
2012/0275335 A1    11/2012  Huang
(Continued)

FOREIGN PATENT DOCUMENTS

CN    101778459 A    7/2010
CN    101820667 A    9/2010
(Continued)

OTHER PUBLICATIONS

Extended European Search Report from EP app. No. 19814214.3, dated Jul. 1, 2021, all pages.
(Continued)

*Primary Examiner* — Gbemileke J Onamuti
(74) *Attorney, Agent, or Firm* — Ladas & Parry, LLP

(57) ABSTRACT

The present disclosure provides a power-saving signal transmission method, a power-saving signal reception method, a base station and a terminal. The power-saving signal transmission method includes: configuring, by a base station, a power-saving mode of a terminal, the power-saving mode including a power consumption mode and/or a power-saving signal transmission and reception mode of the terminal; and transmitting, by the base station, a power-saving signal to the terminal in accordance with the power-saving mode of the terminal.

20 Claims, 4 Drawing Sheets

(51) Int. Cl.
*H04W 72/04* (2023.01)
*H04W 76/11* (2018.01)

(58) Field of Classification Search
USPC .......................................... 370/318
See application file for complete search history.

(56) References Cited

U.S. PATENT DOCUMENTS

| | | | |
|---|---|---|---|
| 2016/0128128 A1* | 5/2016 | Ang | H04W 76/28 370/311 |
| 2016/0295512 A1 | 10/2016 | Hara et al. | |
| 2017/0150343 A1 | 5/2017 | Iwai | |
| 2018/0027495 A1 | 1/2018 | Song et al. | |
| 2018/0132292 A1 | 5/2018 | Yang et al. | |
| 2020/0052835 A1* | 2/2020 | Xiong | H04B 7/0632 |

FOREIGN PATENT DOCUMENTS

| | | |
|---|---|---|
| CN | 104185258 A | 12/2014 |
| CN | 106879007 A | 6/2017 |
| EP | 1913758 A1 | 4/2008 |
| EP | 3042539 A1 | 7/2016 |
| TW | 201004436 A | 1/2010 |
| WO | 2007021115 A1 | 2/2007 |
| WO | 2008111684 A1 | 9/2008 |
| WO | 2015034403 A1 | 3/2015 |
| WO | 2016009579 A1 | 1/2016 |

OTHER PUBLICATIONS

First Office Action and search report from CN app. No. 201810565355.3, dated Apr. 27, 2021, with English translation from Global Dossier.
First Office Action from TW app. No. 108113765, dated Nov. 29, 2020, with machine English translation.
International Search Report from PCT/CN2019/082652, dated Jun. 28, 2019, with English translation from WIPO.
Written Opinion of the International Searching Authority from PCT/CN2019/082652, dated Jun. 28, 2019, with English translation from WIPO.
International Preliminary Report on Patentability from PCT/CN2019/082652, dated Dec. 8, 2020, with English translation from WIPO.
"MS Energy Consumption Evaluation, PSM vs. eDRX", GP-140910, 3GPP TSG GERAN#64, San Francisco, USA, Nov. 17-21, 2014.
"Efficient monitoring of DL control channels", R1-1705017, 3GPP TSG RAN WG1 Meeting #88bis, Spokane, Washington, USA, Apr. 3-7, 2017.

* cited by examiner

POWER-SAVING SIGNAL TRANSMISSION METHOD, POWER-SAVING SIGNAL RECEPTION METHOD, BASE STATION AND TERMINAL

CROSS-REFERENCE TO RELATED APPLICATIONS

The present application is the U.S. national phase of PCT Application No. PCT/CN2019/082652 filed on Apr. 15, 2019, which claims a priority to the Chinese patent application 201810565355.3 filed on Jun. 4, 2018, the disclosures of which are incorporated herein by reference in their entireties.

TECHNICAL FIELD

The present disclosure relates to the field of mobile communication technology, in particular to a power-saving signal transmission method, a power-saving signal reception method, a base station and a terminal.

BACKGROUND

Along with the development of the wireless communications system, there are various terminal types and service types, and such requirements on a terminal as power-saving, network resource-saving and the satisfaction on various service types coexist. In order to reduce the power consumption of the terminal and ensure the service accessibility at the same time, a Wakeup Signal (WUS) has been introduced, and electricity consumption of the terminal is relatively low when monitoring the WUS. Upon the receipt of a WUS from the terminal itself, the terminal is woken up by the WUS, and then a communication module (whose electricity consumption is relatively high) is enabled to receive a paging message, or receive a Physical Downlink Control Channel (PDCCH), or perform Radio Resource Management (RRM) measurement, or receive a synchronization message, thereby to reduce the power consumption of the terminal.

FIGS. 1 and 2 respectively illustrate the transmission of the WUS in a Radio Resource Control (RRC) idle state and an RRC connected state. When a UE is in the idle state, it may enter a sleep state with extremely low electricity consumption. When downlink data is to be transmitted by a network side device to the UE, the WUS is transmitted to the UE. Upon the receipt of the WUS, the UE is woken up, and transmit data to, or receive data from, the network side device. After the transmission or reception of the data has been completed, the UE may enter the sleep state with extremely low electricity consumption. Similarly, when the UE is in the RRC connected state and enters an inactive state, it may enter the sleep state with extremely low electricity consumption. When the UE needs to receive the downlink data, the network side device may transmit the WUS to the UE. Upon the receipt of the WUS, the UE starts to transmit data to, or receive data from, the network side device. Through the above, it is able to reduce the power consumption of the UE.

Currently, the WUS is adopted in a Long Term Evolution (LTE)-based Machine Type Communication (MTC) or Narrow Band Internet Of Thing (NB-IOT) to further reduce the power consumption. On one hand, in terms of technical features of the current MTC or NB-IOT, merely the transmission and reception of the periodic WUS are supported. On the other hand, in terms of power-saving configurations of the terminal, there are merely two configurations, i.e., a power-saving configuration and a non-power-saving configuration, and different power consumption modes in different power-saving configurations as well as different configurations of different WUS transmission modes are not involved.

Based on the above, there is no scheme for the terminal to configure a WUS reception mode and/or different power consumption modes, and update these configurations, so as to meet different power consumption requirements and provide different WUS transmission modes. Currently, the power consumption has not been discussed, and the WUS has not been discussed in a New Radio (NR) or LTE/LTE-Advanced (LTE-A) standard either, so the configurations of the terminal in the power-saving mode and the non-power-saving mode as well as the configurations of different WUS transmission modes have not been discussed with respect to the reduction in the power consumption in the conventional LTE MTC or NB-IOT.

SUMMARY

An object of the present disclosure is to provide a power-saving signal transmission method, a power-saving signal reception method, a base station and a terminal, so as to transmit and receive a power-saving signal and configure a power consumption mode flexibly.

In one aspect, the present disclosure provides in some embodiments a power-saving signal transmission method, including: configuring, by a base station, a power-saving mode of a terminal, the power-saving mode including a power consumption mode and/or a power-saving signal transmission and reception mode of the terminal; and transmitting, by the base station, a power-saving signal to the terminal in accordance with the power-saving mode of the terminal.

In another aspect, the present disclosure provides in some embodiments a power-saving signal reception method, including: configuring, by a terminal, a power-saving mode of the terminal, the power-saving mode including a power consumption mode and/or a power-saving signal transmission and reception mode of the terminal; and receiving, by the terminal, a power-saving signal from a base station in accordance with the power-saving mode of the terminal.

In yet another aspect, the present disclosure provides in some embodiments a base station, including a transceiver, a memory, a processor, and a program stored in the memory and executed by the processor. The processor is configured to read the program stored in the memory so as to configure a power-saving mode of a terminal, the power-saving mode including a power consumption mode and/or a power-saving signal transmission and reception mode of the terminal. The transceiver is configured to transmit a power-saving signal to the terminal in accordance with the power-saving mode of the terminal.

In still yet another aspect, the present disclosure provides in some embodiments a base station, including: a first configuration unit configured to configure a power-saving mode of a terminal, the power-saving mode including a power consumption mode and/or a power-saving signal transmission and reception mode of the terminal; and a first transmission unit configured to transmit a power-saving signal to the terminal in accordance with the power-saving mode of the terminal.

In still yet another aspect, the present disclosure provides in some embodiments a terminal, including a transceiver, a memory, a processor, and a computer program stored in the memory and executed by the processor. The processor is configured to read the computer program stored in the memory so as to configure a power-saving mode of the terminal, the power-saving mode including a power consumption mode and/or a power-saving signal transmission and reception mode of the terminal. The transceiver is configured to receive a power-saving signal from a base station in accordance with the power-saving mode of the terminal.

In still yet another aspect, the present disclosure provides in some embodiments a terminal, including: a first configuration unit configured to configure a power-saving mode of the terminal, the power-saving mode including a power consumption mode and/or a power-saving signal transmission and reception mode of the terminal; and a first reception unit configured to receive a power-saving signal from a base station in accordance with the power-saving mode of the terminal.

In still yet another aspect, the present disclosure provides in some embodiments a computer-readable storage medium storing therein instructions. The instructions are executed by a computer so as to implement the above-mentioned power-saving signal transmission method or the above-mentioned power-saving signal reception method.

According to the power-saving signal transmission method, the power-saving signal reception method, the base station and the terminal in the embodiments of the present disclosure, as compared with the related art, it is able to transmit and receive the power-saving signal and flexibly configure the power consumption mode of the terminal.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

Figure 1:
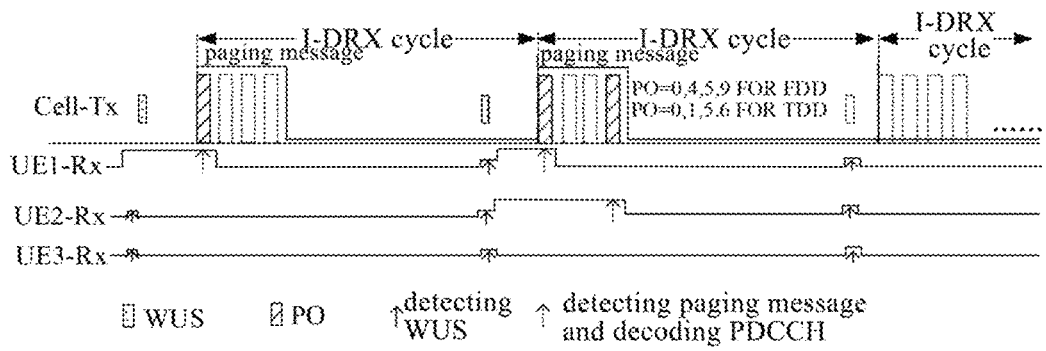
FIG. 1 is a schematic view showing a scenario where a WUS is transmitted.
Figure 2:
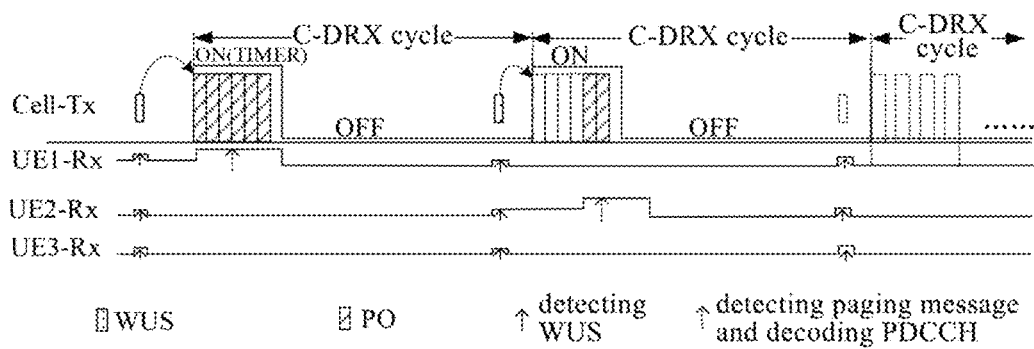
FIG. 2 is another schematic view showing the scenario where the WUS is transmitted.

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. The expression "and/or" involved in the embodiments of the present disclosure may represent at least one of listed items.

The technology described in the context shall not be limited to a Long Term Evolution (LTE)/LTE-Advanced (LTE-A) system, and it may also be applied to various wireless communications systems, e.g., Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), or any other system. The terms "system" and "network" may be replaced with each other. The CDMA system may be used to implement such radio technologies as CDMA2000 and Universal Terrestrial Radio Access (UTRA). The UTRA may include Wideband Code Division Multiple Access (WCDMA) and the other CDMA variants. The TDMA system may be used to implement such a radio technology as Global System for Mobile Communication (GSM). The OFDMA system may be used to implement such radio technologies as Ultra Mobile Broadband (UMB), Evolved-UTRA (E-UTRA), IEEE 802.11 (Wireless Fidelity (Wi-Fi)), IEEE 802.16 (WiMAX), IEEE 802.20, and Flash-OFDM. The UTRA and the E-UTRA are parts of a Universal Mobile Telecommunications System (UMTS). The LTE and a more advanced LTE (e.g., LTE-A) are new UMTS versions using the E-UTRA. The UTRA, E-UTRA, UMTS, LTE, LTE-A and GSM have been described in literatures from the $3^{rd}$-Generation Partnership Project (3GPP). The CDMA2000 and UMB have been described in literatures from the $3^{rd}$-Generation Partnership Project2 (3GPP2). The technology described in the context may be applied to the above-mentioned systems and radio technologies, or applied to the other systems and radio technologies. However, a New Radio (NR) system has been described illustratively hereinafter, and terms for the NR system have been used in most of the description, although these technologies may also be applied to the systems other than the NR system.

The following description is given for illustrative purposes but shall not be construed as limiting the scope, applicability or configuration set forth in the appended claims. Any alterations may be made on functions and arrangements of the discussed elements without departing from the spirit and scope of the present disclosure. Various procedures or assemblies may be omitted, replaced or added appropriately in the examples. For example, steps of the described method may be performed in an order different from that described in the context, and some steps may be added, omitted or combined. In addition, the features described with reference to some examples may be combined in the other examples.

For ease of understanding, Table 1 shows some abbreviations that may occur in the specification.

TABLE 1

| Abbreviation | Complete spelling in English | Meaning in Chinese |
| --- | --- | --- |
| WUS | Wake Up Signal | 唤醒信号 |
| RRC | Radio Resouce Control | 无线资源控制 |
| RRC_IDLE/ RRC_Inactive | RRC_IDLE/RRC_Inactive | RRC空闲态, RRC 非活动态 |
| WUS Area | Wake Up Signal Area | 唤醒信号区域 |
| WUS Area ID | Wake Up Signal Area ID | 唤醒信号区域标识 |
| RRM | Radio Resource Management | 无线资源管理 |
| LTE | Long Term Evolution | 长期演进 |
| NR | Next Radio | 下一代通信 |
| On-demand RS | On-demand Reference Signal | 触发式参考信号 |
| RRM | Radio Resource Management | 无线资源管理 |
| PSS | Primary Synchronization Signal | 主同步信号 |
| SSS | Secondary Synchronization Signal | 辅同步信号 |
| CRS | Cell Reference Signal | 公共参考信号 |
| CSI-RS | Channel State Information Reference Signal | 信道状态信息参考信号 |
| SRS | Sounding Reference Signal | 探测参考信号 |
| TRS | Tracking Reference Signal | 跟踪信号 |
| SSB | Synchronization Signal/PBCH | 同步广播信号 |
| PDCCH | Physical Downlink Control Channel | 物理层下行控制信道 |
| DCI | Downlink Control Indication | 下行控制指示 |
| RSRP | Reference Signal Received Power | 参考信号接收功率 |
| RSRQ | Reference Signal Received Quality | 参考信号接收信号质量 |
| RSSI | Reference Signal Strength Indicator | 参考信号强度指示 |
| paging | paging | 寻呼 |

Figure 3:
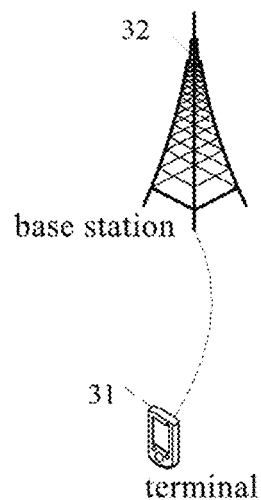
FIG. 3 is a block diagram of an applicable wireless communications system according to one embodiment of the present disclosure.

FIG. 3 is a block diagram of an applicable wireless communications system according to one embodiment of the present disclosure. The wireless communications system includes a terminal 31 and a base station 32. The terminal 31 may also be called as a User Equipment (UE), and it may be a terminal side device such as a mobile phone, a tablet personal computer, a laptop computer, a Personal Digital Assistant (PDA), a Mobile Internet Device (MID), a wearable device or a vehicle-mounted device. It should be appreciated that, the specific type of the terminal 31 will not be particularly defined herein. The base station 32 may be a $5^{th}$-Generation (5G) base station or a future base station (e.g., gNB, 5G NR NB), or a base station in the other communications system (e.g., eNB, Wireless Local Area Network (WLAN) access point, or any other access point). The base station may be called as node B, evolved node B, access point, Base Transceiver Station (BTS), radio base station, radio transceiver, Basic Service Set (BSS), Extended service Set (ESS), home node B, evolved home node B, WLAN access point, WiFi node or any other appropriate term in the field. The base station shall not be limited to a specific technical term, as long as a same technical effect is achieved. It should be appreciated that, merely the base station in the NR system is taken as an example in the embodiments of the present disclosure, but a specific type of the base station will not be particularly defined herein.

The base station 32 may communicate with the terminal 31 under the control of a base station controller. In various examples, the base station controller may be a part of a core network or some base stations. Some base stations may exchange control information or user data with the core network through backhaul. In some examples, some of the base stations may directly or indirectly communicate with each other through a backhaul link, and the backhaul link may be a wired or wireless communication link. The wireless communications system may support operations on a plurality of carriers (waveform signals at different frequencies). A multi-carrier transmitter may transmit modulated signals on the plurality of carriers simultaneously. For example, each communication link may be a multi-carrier signal modulated using various radio technologies. Each modulated signal may be transmitted on different carriers and may carry control information (e.g., reference signal or control channel), overhead information, data, etc.

The base station 32 may communicate with the terminal 31 in a wireless manner via one or more access points. Each base station may provide communications coverage at a corresponding coverage region. A coverage region for an access point may be a sector merely constituting a part of the coverage region. The wireless communications system may include various base stations (e.g., macro base station, micro base station, or pico base station). The base station may also use different radio technologies, e.g., cellular or WLAN radio access technology. The base station may be associated with same or different access network or operator deployments. The coverage regions of different base stations (including the coverage regions of the base stations of a same type or different types, the coverage regions using same or different radio technologies, or the coverage regions belonging to same or different access networks) may overlap each other.

A communication link in the wireless communications system may include an uplink for carrying uplink (UL) transmission (e.g., from the terminal 31 to the base station 32), or a terminal for carrying downlink (DL) transmission (e.g., from the base station 32 to the terminal 31). The UL transmission may also be called as reverse link transmission, and the DL transmission may also be called as forward link transmission. The downlink transmission may be performed using a licensed frequency band, a non-licensed frequency band or both. Similarly, the uplink transmission may be performed using the licensed frequency band, the non-licensed frequency band or both.

Figure 4:
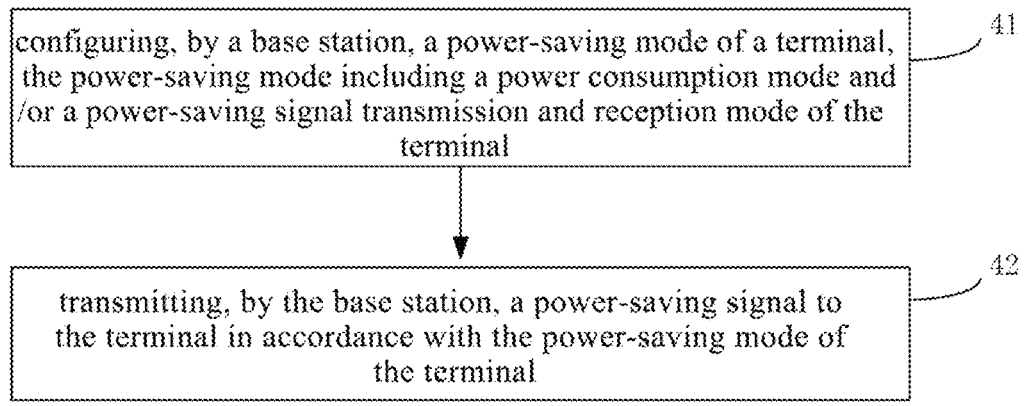
FIG. 4 is a flow chart of a power-saving signal transmission method according to one embodiment of the present disclosure.

As shown in FIG. 4, the present disclosure provides in some embodiments a power-saving signal transmission method, which includes the following steps.

Step 41: configuring, by a base station, a power-saving mode of a terminal, the power-saving mode including a power consumption mode and/or a power-saving signal transmission and reception mode of the terminal.

Here, power consumption of the terminal may also be called as energy consumption, energy loss, or power loss.

The power consumption mode may include at least one of a first power consumption mode, a second power consumption mode and a third power consumption mode. The first power consumption mode may be a power consumption mode when the terminal is receiving data normally, power consumption in the first power consumption mode may be greater than or equal to a first threshold, and the first threshold may be a real number. To be specific, the power consumption may be energy consumption on an available bandwidth, and the available bandwidth may be all or a part of a predefined bandwidth, all carriers, all activated carriers, or a part of the activated carriers. The normal data reception may refer to the reception of a Physical Downlink Control Channel (PDCCH), a Physical Downlink Shared Channel (PDSCH), a synchronization signal, or any other reference signal by a UE. The other reference signal may be a cell common reference signal, or a UE-specific reference signal, e.g., Cell Reference Signal (CRS), Cell State Information Reference Signal (CSI-RS), or any other reference signal, which will not be particularly defined herein. The second power consumption mode may be a consumption mode where the terminal receives the data in a low power consumption state. To be specific, power consumption in the second power consumption mode may be greater than or equal to a second threshold and smaller than the first threshold, and the second threshold may be a real number. To be specific, the power consumption may be power consumption when the UE is receiving a WUS, and the WUS may be a periodic signal, or an aperiodic on-demand signal. The third power consumption mode may be a power consumption mode where the terminal receives the data in an extremely low power consumption state. To be specific, power consumption in the third power consumption mode may be smaller than the second threshold. The power consumption may be power consumption when the UE is receiving the WUS, and the WUS may be a periodic signal, or an aperiodic on-demand signal.

Here, in the third power consumption mode, the power consumption of the UE smaller than that in the second power consumption mode may be achieved as follows. In a possible embodiment of the present disclosure, the power consumption of the terminal may be reduced through using an element with low power consumption, or enabling the terminal to be in a better propagation environment and using a receiver with better sensitivity, or reducing the bandwidth for receiving the WUS or the quantity of reception antennae, or any other methods, which will not be particularly defined herein.

Step 42: transmitting, by the base station, a power-saving signal to the terminal in accordance with the power-saving mode of the terminal.

According to the power-saving signal transmission method in the embodiments of the present disclosure, through configuring the power-saving mode of the terminal, it is able to transmit the power-saving signal in accordance with the configured power-saving mode, thereby to transmit and receive the power-saving signal and configure the power consumption mode flexibly.

To be specific, in Step 41, the configuring, by the base station, the power-saving mode of the terminal may include configuring, by the base station a first power-saving mode of the terminal at a first time point. Subsequent to configuring the first power-saving mode, the method may further include configuring, by the base station, a second power-saving mode of the terminal at a second time point, and the first power-saving mode may be different from the second power-saving mode.

Here, it should be appreciated that, the base station may configure the power-saving mode for the terminal flexibly. In other words, after configuring the first power-saving mode at the first time point, the base station may configure the second power-saving mode for the terminal. The second power-saving mode may be different from, or the same as, the first power-saving mode. Through configuring the power-saving modes flexibly for the terminal at different time points, it is able for the terminal to flexibly adjust configurations to meet different power consumption requirements, thereby to further reduce the power consumption.

To be specific, the first time point and the second time point may each be a pre-agreed configuration time, or a static/semi-static configuration time, or a dynamic configuration time. The dynamic configuration may include a Downlink Control Indication (DCI) dynamic indicator, or a Radio Network Temporary Identity (RNTI)-scrambled PDCCH dynamic indicator.

Here, the first time point may be predefined, and it may be a boundary of any symbol, slot or subframe. The second time point may be a boundary of a subframe, slot or symbol.

A period of the static configuration time may be greater than a period of the semi-static configuration time. In a possible embodiment of the present disclosure, the period may be indicated by the base station through Radio Resource Control (RRC) signaling, or a Medium Access Control Control Element (MAC CE).

In Step 41, the power-saving signal transmission and reception mode may include at least one of a periodic transmission and reception mode, an aperiodic on-demand transmission and reception mode, and a prohibited transmission and reception mode.

In other words, the power-saving signal transmission and reception mode may include a first transmission and reception mode, a second transmission and reception mode, and a third transmission and reception mode. The first transmission and reception mode may be a mode where the WUS is transmitted and received periodically, the second transmission and reception mode may be a mode where the WUS is transmitted and received aperiodically in an on-demand manner, and the third transmission and reception mode may be the prohibited transmission and reception mode.

To be specific, the power-saving mode may include the power-consumption mode and/or the power-saving signal transmission and reception mode of the terminal. The base station may transmit the power-saving signal to the terminal in accordance with the power-saving mode. A transmission mode may be determined in accordance with the transmission and reception mode in the power-saving mode.

In the embodiments of the present disclosure, a correspondence between the power consumption modes and the power-saving signal transmission and reception modes may be pre-agreed. In this regard, when the power-saving mode merely includes the power consumption mode of the terminal, the transmitting, by the base station, the power-saving signal to the terminal in accordance with the power-saving mode of the terminal may include: determining, by the base station, the power-saving signal transmission and reception mode corresponding to the power consumption mode of the terminal, e.g., determining the power-saving signal transmission and reception mode corresponding to the power consumption mode of the terminal in accordance with the pre-agreed correspondence; and transmitting, by the base station, the power-saving signal to the terminal in accordance with the determined transmission and reception mode.

Here, the power-saving mode merely includes the power consumption mode, so in the embodiments of the present disclosure, the base station may determine a transmission and reception mode in accordance with the power-saving signal transmission and reception mode corresponding to the power consumption mode, and then transmit the power-saving signal to the terminal in accordance with the determined transmission and reception mode.

To be specific, in a possible embodiment of the present disclosure, the prohibited transmission and reception mode may correspond to the first power consumption mode, the periodic transmission and reception mode may correspond to the second power consumption mode, and the aperiodic on-demand transmission and reception mode may correspond to the third power consumption mode. The power consumption of the terminal in the first power consumption mode, the second power consumption mode and the third power consumption mode may decrease gradually.

It should be appreciated that, the above-mentioned one-to-one correspondence between the transmission and reception modes and the power consumption modes is merely for illustrative purposes, and in the embodiments of the present disclosure, one transmission and reception mode may correspond to one or more power consumption modes. For example, the periodic transmission and reception mode may correspond to the first or second power consumption mode.

To be specific, in Step 41, the power consumption mode of the terminal may be configured as follows.

In one possible embodiment of the present disclosure, the base station may configure the power consumption mode of the terminal in accordance with measurement information reported by the terminal, and the measurement information may include a measurement value of a target signal. Here, the measurement value may be Reference Signal Received Power (RSRP), Reference Signal Received Quality (RSRQ), Reference signal Strength Indicator (RSSI), or Signal to Interference plus Noise Ratio (SINR). The terminal may perform the measurement on the basis of at least one of the power-saving signal, an on-demand Reference signal (RS), a Primary Synchronization Signal (PSS)/Secondary Synchronization Signal (SSS), a Synchronization Signal/PBCH (SSB), a CSI-RS, and a CRS. The on-demand RS may be an aperiodic signal, or a reference signal with a predefined transmission pattern, and it may be used for the rapid synchronization and/or RRM measurement of the terminal.

In another possible embodiment of the present disclosure, the base station may randomly select one power consumption mode as the power consumption mode of the terminal. Here, the power consumption mode configured by the base station may be randomly selected by the base station. In a possible embodiment of the present disclosure, the base station may uniformly and randomly select one power consumption mode from the power consumption modes supported by the terminal as the power consumption mode of the terminal.

In yet another possible embodiment of the present disclosure, the base station may configure the power consumption mode of the terminal in accordance with a configuration history of the power consumption mode of the terminal. Here, the power consumption mode may be configured in accordance with a historical power consumption mode of the UE. For example, the base station may configure the power consumption mode in accordance with a previous power consumption mode, i.e., the currently-configured power consumption mode may be the same as the previously-configured power consumption mode.

In still yet another possible embodiment of the present disclosure, the base station may configure the power consumption mode of the terminal in accordance with transmission power of the base station. For example, when the transmission power configured for the base station is smaller than or equal to a first power threshold, the base station may configure the third power consumption mode or the first power consumption mode as the power-saving mode of the terminal. When the transmission power configured for the base station is greater than the first power threshold, the base station may configure the second power consumption mode or the first power consumption mode as the power-saving mode of the terminal.

In still yet another possible embodiment of the present disclosure, the base station may configure the power consumption mode of the terminal in accordance with a service type of the terminal. For example, the terminal needs to maintain the normal data reception when some services, e.g., calling, are provided. At this time, the power-saving mode configured by the base station may be the first power consumption mode.

To be specific, in Step 41, the power-saving signal transmission and reception mode may be configured as follows.

In a possible embodiment of the present disclosure, the base station may receive measurement information reported by the terminal, and configure the power-saving signal transmission and reception mode in accordance with the measurement information. The measurement information may include a measurement value of a target signal. Here, the measurement value may be RSRP, RSRQ, RSSI or SINR. The measurement may be performed by the terminal on the basis of at least one of the power-saving signal, an on-demand RS, a PSS/SSS, an SSB, a CSI-RS, and a CRS. The on-demand RS may be an aperiodic signal, or a reference signal with a predefined transmission pattern, and it may be used for the rapid synchronization and/or RRM measurement of the terminal.

In another possible embodiment of the present disclosure, the base station may configure the power-saving signal transmission and reception mode in accordance with a transmission and reception mode selected randomly.

In yet another possible embodiment of the present disclosure, the base station may configure the power-saving signal transmission and reception mode in accordance with a configuration history of the power-saving signal transmission mode of the terminal. For example, the base station may determine the power-saving signal transmission and reception mode in accordance with a previous power-saving signal transmission and reception mode.

In still yet another possible embodiment of the present disclosure, the base station may configure the power-saving signal transmission and reception mode in accordance with the transmission power of the base station. For example, when the transmission power configured for the base station is smaller than or equal to a third power threshold, the base station may configure the first transmission and reception mode or the second transmission and reception mode as the power-saving signal transmission and reception mode of the terminal. When the transmission power configured for the base station is greater than a fourth power threshold, the base station may configure the second transmission and reception mode or the first transmission and reception mode as the power-saving signal transmission and reception mode of the terminal.

In still yet another possible embodiment of the present disclosure, the base station may configure the power-saving signal transmission and reception mode of the terminal in accordance with the service type of the terminal.

In a possible embodiment of the present disclosure, the power-saving signal transmission method may further include configuring, by the base station, a wake-up region for the terminal. The transmitting, by the base station, the power-saving signal to the terminal in accordance with the power-saving mode of the terminal may include transmitting, by the base station, the power-saving signal in accordance with the power-saving mode and the wake-up region of the terminal.

Here, the wake-up region may be a region where the WUS is transmitted uniformly, and it may include at least one transmission and reception point. The terminal may match its own wake-up region Identity (ID) with a wake-up region ID from the base station, and when the two match successfully, the terminal may merely respond to the WUS at the wake-up region. The wake-up region ID may be a unique identity of the wake-up region, and it may include a group of sequences.

To be specific, the wake-up region of the terminal may be configured by the base station as follows.

In a possible embodiment of the present disclosure, the base station may receive measurement information reported by the terminal, and configure the wake-up region of the terminal in accordance with the measurement information. The measurement information may include a measurement value of a target signal. Here, the measurement value may be RSRP, RSRQ, RSSI, or SINR. The measurement may be performed by the terminal on the basis of at least one of the power-saving signal, an on-demand RS, a PSS/SSS, an SSB, a CSI-RS, and a CRS. The on-demand RS may be an aperiodic signal, or a reference signal with a predefined transmission pattern, and it may be used for the rapid synchronization and/or RRM measurement of the terminal.

In another possible embodiment of the present disclosure, the base station may configure the wake-up region of the terminal in accordance with a wake-up region randomly selected.

In yet another possible embodiment of the present disclosure, the base station may configure the wake-up region of the terminal in accordance with a configuration history of the wake-up region of the terminal. Here, the base station may configure the wake-up region of the terminal in accordance with a previous wake-up region, e.g., a currently-configured wake-up region may be the same as a previously-configured wake-up region.

In still yet another possible embodiment of the present disclosure, the base station may configure the wake-up region of the terminal in accordance with the transmission power of the base station. For example, when the transmission power configured for the base station is smaller than or equal to a fifth power threshold, the quantity of transmission and reception points at the wake-up region configured by the base station may be a first numerical value which is a positive integer greater than zero. When the transmission power configured for the base station is greater than the fifth power threshold, the quantity of transmission and reception points at the wake-up region configured by the base station may be a second numerical value which is a positive integer greater than zero.

Figure 5:
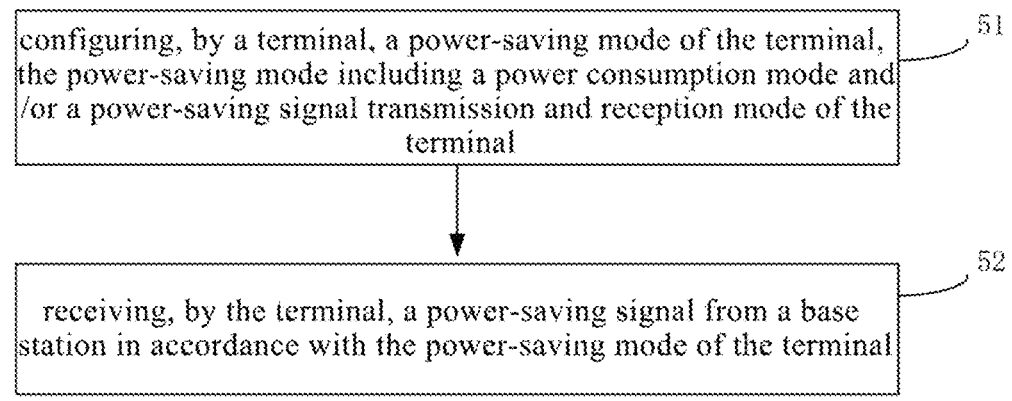
FIG. 5 is a flow chart of a power-saving signal reception method according to one embodiment of the present disclosure.

As shown in FIG. 5, the present disclosure further provides in some embodiments a power-saving signal reception method, which includes the following steps.

Step 51: configuring, by a terminal, a power-saving mode of the terminal, the power-saving mode including a power consumption mode and/or a power-saving signal transmission and reception mode of the terminal.

Here, identical to the power consumption mode in the above-mentioned power-saving signal transmission method, the power consumption mode in the power-saving mode configured by the terminal may also include at least one of the first power consumption mode, the second power consumption mode and the third power consumption mode. Each of the power consumption modes may be the same as that mentioned hereinabove, and thus will not be particularly defined herein.

Step 52: receiving, by the terminal, a power-saving signal from a base station in accordance with the power-saving mode of the terminal.

Here, the terminal may receive the power-saving signal at a configured power-saving signal transmission time point of the base station or a configured power-saving signal reception time point of the terminal. To be specific, the terminal may receive the power-saving signal at a first time point, and the first time point may be a boundary of a subframe, a slot or a symbol.

Through Steps 51 and 52, it is able to flexibly configure the power consumption mode and power-saving signal transmission and reception mode of the terminal.

To be specific, in Step 51, the configuring, by the terminal, the power-saving mode of the terminal may include configuring, by the terminal, a first power-saving mode of the terminal at the first time point. Subsequent to configuring the first power-saving mode, the method may further include configuring, by the terminal, a second power-saving mode of the terminal at a second time point, and the first power-saving mode may be different from the second power-saving mode.

Here, through flexibly configuring the power-saving modes at different time points, it is able for the terminal to flexibly adjust its configurations to meet different power consumption requirements, thereby to further reduce the power consumption of the terminal.

To be specific, the first time point and the second time point may each be a pre-agreed configuration time, or a static/semi-static configuration time, or a dynamic configuration time. The dynamic configuration may include a DCI dynamic indicator, or an RNTI-scrambled PDCCH dynamic indicator.

Here, the first time point may be predefined, and it may be a boundary of any symbol, slot or subframe. The second time point may be a boundary of a subframe, slot or symbol.

A period of the static configuration time may be greater than a period of the semi-static configuration time. In a possible embodiment of the present disclosure, the period may be indicated by the base station through RRC signaling, or an MAC CE.

In Step 51, the power-saving signal transmission and reception mode may include at least one of a periodic transmission and reception mode, an aperiodic on-demand transmission and reception mode, and a prohibited transmission and reception mode.

In other words, the power-saving signal transmission and reception mode may include a first transmission and reception mode, a second transmission and reception mode, and a third transmission and reception mode. The first transmission and reception mode may be a mode where the WUS is transmitted and received periodically, the second transmission and reception mode may be a mode where the WUS is transmitted and received aperiodically in an on-demand manner, and the third transmission and reception mode may be the prohibited transmission and reception mode.

In a possible embodiment of the present disclosure, when the power-saving mode merely includes the power consumption mode of the terminal, the receiving, by the terminal, the power-saving signal from the base station in accordance with the power-saving mode of the terminal may include: determining, by the terminal, the power-saving signal transmission and reception mode corresponding to the power consumption mode of the terminal; and receiving, by the terminal, the power-saving signal from the base station in accordance with the determined transmission and reception mode.

Here, the power-saving mode merely includes the power consumption mode, so in the embodiments of the present disclosure, the transmission and reception mode may be determined in accordance with the power-saving signal transmission and reception mode corresponding to the power consumption mode, and then the power-saving signal may be received from the base station in accordance with the determined transmission and reception mode.

To be specific, in a possible embodiment of the present disclosure, the prohibited transmission and reception mode may correspond to the first power consumption mode, the periodic transmission and reception mode may correspond to the second power consumption mode, and the aperiodic on-demand transmission and reception mode may correspond to the third power consumption mode. The power consumption of the terminal in the first power consumption mode, the second power consumption mode and the third power consumption mode may decrease gradually.

It should be appreciated that, the above-mentioned one-to-one correspondence between the transmission and reception modes and the power consumption modes is merely for illustrative purposes, and in the embodiments of the present disclosure, one transmission and reception mode may correspond to one or more power consumption modes. For example, the periodic transmission and reception mode may correspond to the first or second power consumption mode.

To be specific, in Step 51, the power consumption mode of the terminal may be configured as follows.

In one possible embodiment of the present disclosure, the terminal may receive configuration information about the power consumption mode of the terminal from the base station, and configure the power consumption mode of the terminal. Here, the configuration information may be indicated by the base station through RRC signaling or an MAC CE. The description about the power consumption mode configured by the base station may refer to the relevant contents about the configuration of the power consumption mode for the terminal in the above-mentioned transmission method, and thus will not be particularly defined herein.

In another possible embodiment of the present disclosure, the terminal may configure the power consumption mode of the terminal in accordance with measurement information, and the measurement information may include a measurement value of a target signal. Here, the measurement value may be RSRP, RSRQ, RSSI or SINR, or any other values which will not be particularly defined herein. The measurement may be performed by the terminal on the basis of at least one of the power-saving signal, an on-demand RS, a PSS/SSS, an SSB, a CSI-RS, and a CRS. The on-demand RS may be an aperiodic signal, or a reference signal with a predefined transmission pattern, and it may be used for the rapid synchronization and/or RRM measurement of the terminal.

To be specific, in Step 51, the power-saving signal transmission and reception mode may be configured as follows. The terminal may receive transmission and reception configuration information about the transmission and reception mode of the terminal from the base station, and configure the transmission and reception mode of the terminal in accordance with the transmission and reception configuration information.

Here, the terminal needs to receive the power-saving signal from the base station, so a reception mode of the terminal shall match a transmission mode of the base station. At this time, the transmission and reception mode of the terminal may be configured in accordance with the transmission and reception configuration information from the base station. Here, the configuration information may be indicated by the base station through RRC signaling or an MAC CE. The description about the transmission and reception mode configured by the base station may refer to the relevant contents about the configuration of the transmission and reception mode for the terminal in the above-mentioned transmission method, and thus will not be particularly defined herein.

In a possible embodiment of the present disclosure, the power-saving signal reception method may further include configuring, by the terminal, a wake-up region for the terminal. Here, the wake-up region has already been described in the above-mentioned transmission method, and thus will not be particularly defined herein.

The receiving, by the terminal, the power-saving signal from the base station in accordance with the power-saving mode of the terminal may include receiving, by the terminal, the power-saving signal in accordance with the power-saving mode of the terminal and the wake-up region.

Here, when the wake-up region is configured for the terminal, the terminal may merely respond to the WUS at the wake-up region.

To be specific, the wake-up region of the terminal may be configured by the terminal as follows.

In a possible embodiment of the present disclosure, the terminal may receive region configuration information about the wake-up region of the terminal from the base station, and configure the wake-up region in accordance with the region configuration information. Here, the configuration information may be indicated by the base station through RRC signaling or an MAC CE. The description about the wake-up region configured by the base station may refer to the relevant contents about the configuration of the wake-up region for the terminal in the above-mentioned transmission method, and thus will not be particularly defined herein.

In another possible embodiment of the present disclosure, the terminal may configure the wake-up region for the terminal in accordance with measurement information, and the measurement information may include a measurement value of a target signal. The measurement value may be RSRP, RSRQ, RSSI or SINR, or any other values which will not be particularly defined herein. The measurement may be performed by the terminal on the basis of at least one of the power-saving signal, an on-demand RS, a PSS/SSS, an SSB, a CSI-RS, and a CRS. The on-demand RS may be an aperiodic signal, or a reference signal with a predefined transmission pattern, and it may be used for the rapid synchronization and/or RRM measurement of the terminal.

Here, the terminal may autonomously configure the wake-up region. To be specific, the terminal may statically or semi-statically configure the wake-up region. For example, the terminal may update the wake-up region at a first period, e.g., tens of milliseconds, several seconds, tens of seconds, or larger. The terminal may also dynamically update the wake-up region at a second period, e.g., several symbols, several slots, several milliseconds, or tens of milliseconds. The second period may be smaller than or equal to the first period.

Based on the above method, the present disclosure further provides in some embodiments a device for implementing the above-mentioned transmission method.

Figure 6:
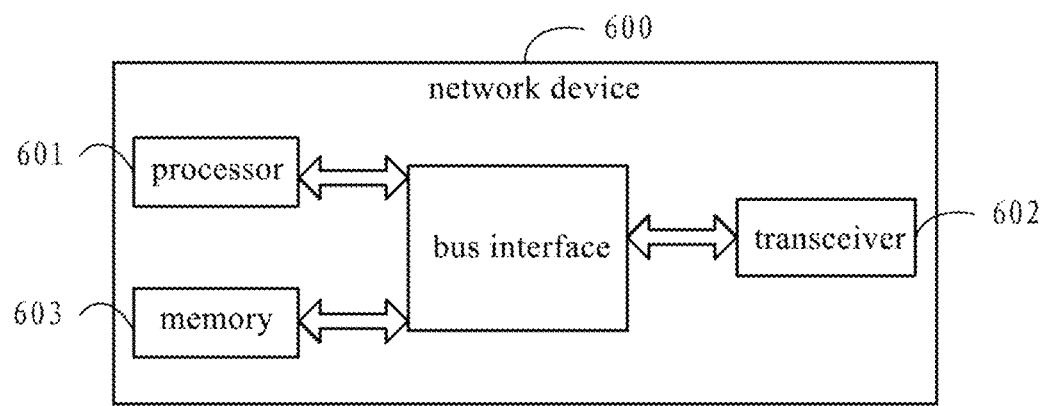
FIG. 6 is a schematic view showing a network device according to one embodiment of the present disclosure.

As shown in FIG. 6, the present disclosure provides in some embodiments a network device 600, which includes a processor 601, a transceiver 602, a memory 603 and a bus interface.

In the embodiments of the present disclosure, the network device 600 may further include a computer program stored in the memory 603 and executed by the processor 601.

The processor is configured to read the computer program stored in the memory, so as to configure a power-saving mode of a terminal, the power-saving mode including a power consumption mode and/or a power-saving signal transmission and reception mode of the terminal. The transceiver is configured to transmit a power-saving signal to the terminal in accordance with the power-saving mode of the terminal.

In FIG. 6, bus architecture may include a number of buses and bridges connected to each other, so as to connect various circuits for one or more processors 601 and one or more memories 603. In addition, as is known in the art, the bus architecture may be used to connect any other circuits, such as a circuit for a peripheral device, a circuit for a voltage stabilizer and a power management circuit. The bus interface may be provided, and the transceiver 602 may consist of a plurality of elements, i.e., a transmitter and a receiver for communication with any other devices over a transmission medium.

The processor 601 may take charge of managing the bus architecture as well as general processings. The memory 603 may store therein data for the operation of the processor 601.

Here, the network device may be a base station.

In a possible embodiment of the present disclosure, the processor is further configured to configure a first power-saving mode of the terminal at a first time point. After configuring the first power-saving mode, the processor is further configured to configure a second power-saving mode of the terminal at a second time point, and the first power-saving mode may be different from the second power-saving mode.

In a possible embodiment of the present disclosure, the first time point and the second time point may each be a pre-agreed configuration time, or a static/semi-static configuration time, or a dynamic configuration time. The dynamic configuration may include a DCI dynamic indicator, or an RNTI-scrambled PDCCH dynamic indicator.

In a possible embodiment of the present disclosure, the power-saving signal transmission and reception mode may include at least one of a periodic transmission and reception mode, an aperiodic on-demand transmission and reception mode, and a prohibited transmission and reception mode.

In a possible embodiment of the present disclosure, when the power-saving mode merely includes the power consumption mode of the terminal, the transceiver is further configured to: determine the power-saving signal transmission and reception mode corresponding to the power consumption mode of the terminal; and transmit the power-saving signal to the terminal in accordance with the determined transmission and reception mode.

In a possible embodiment of the present disclosure, the prohibited transmission and reception mode may correspond to a first power consumption mode, the periodic transmission and reception mode may correspond to a second power consumption mode, and the aperiodic on-demand transmission and reception mode may correspond to a third power consumption mode. The power consumption of the terminal in the first power consumption mode, the second power consumption mode and the third power consumption mode may decrease gradually.

In a possible embodiment of the present disclosure, the processor is further configured to: configure the power consumption mode of the terminal in accordance with measurement information reported by the terminal, the measurement information including a measurement value of a target signal; or randomly select one power consumption mode as the power consumption mode of the terminal; or configure the power consumption mode of the terminal in accordance with a configuration history of the power consumption mode of the terminal; or configure the power consumption mode of the terminal in accordance with transmission power of the base station; or configure the power consumption mode of the terminal in accordance with a service type of the terminal.

In a possible embodiment of the present disclosure, the processor is further configured to: receive measurement information reported by the terminal and configure the power-saving signal transmission and reception mode in accordance with the measurement information, the measurement information including a measurement value of a target signal; or configure the power-saving signal transmission and reception mode in accordance with a transmission and reception mode selected randomly; or configure the power-saving signal transmission and reception mode in accordance with a configuration history of the power-saving signal transmission and reception mode of the terminal; or configure the power-saving signal transmission and reception mode in accordance with transmission power of the base station; or configure the power-saving signal transmission and reception mode in accordance with a service type of the terminal.

In a possible embodiment of the present disclosure, the processor is further configured to configure a wake-up region for the terminal, and the transceiver is further configured to transmit the power-saving signal in accordance with the power-saving mode of the terminal and the wake-up region.

In a possible embodiment of the present disclosure, the processor is further configured to: receive measurement information reported by the terminal and configure the wake-up region for the terminal in accordance with the measurement information, the measurement information including a measurement value of a target signal; or configure the wake-up region for the terminal in accordance with a wake-up region randomly selected; or configure the wake-up region for the terminal in accordance with a configuration history of the wake-up region for the terminal; or configure the wake-up region for the terminal in accordance with transmission power of the base station.

Figure 7:
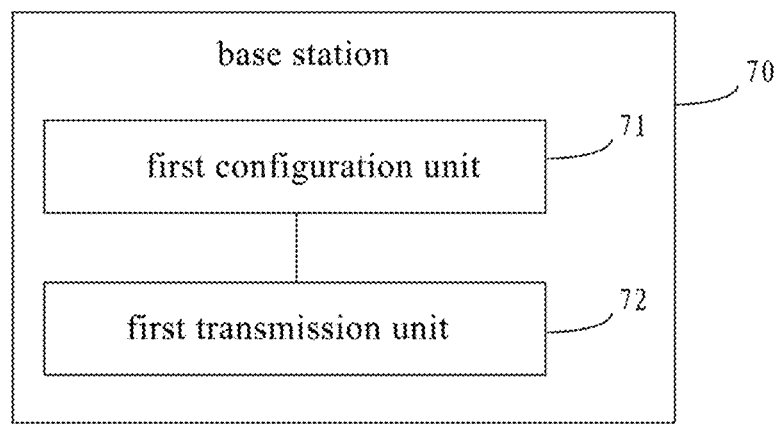
FIG. 7 is a schematic view showing a base station according to one embodiment of the present disclosure.

As shown in FIG. 7, the present disclosure further provides in some embodiments a base station 70, which includes: a first configuration unit 71 configured to configure a power-saving mode of a terminal, the power-saving mode including a power consumption mode and/or a power-saving signal transmission and reception mode of the terminal; and a transmission unit 72 configured to transmit a power-saving signal to the terminal in accordance with the power-saving mode of the terminal.

In a possible embodiment of the present disclosure, the first configuration unit is further configured to configure a first power-saving mode of the terminal at a first time point. After configuring the first power-saving mode, the first configuration unit is further configured to configure a second power-saving mode of the terminal at a second time point, and the first power-saving mode may be different from the second power-saving mode.

In a possible embodiment of the present disclosure, the first time point and the second time point may each be a pre-agreed configuration time, or a static/semi-static configuration time, or a dynamic configuration time. The dynamic configuration may include a DCI dynamic indicator, or an RNTI-scrambled PDCCH dynamic indicator.

In a possible embodiment of the present disclosure, the power-saving signal transmission and reception mode may include at least one of a periodic transmission and reception mode, an aperiodic on-demand transmission and reception mode, and a prohibited transmission and reception mode.

In a possible embodiment of the present disclosure, when the power-saving mode merely includes the power consumption mode of the terminal, the transmission unit is further configured to: determine the power-saving signal transmission and reception mode corresponding to the power consumption mode of the terminal; and transmit the power-saving signal to the terminal in accordance with the determined transmission and reception mode.

In a possible embodiment of the present disclosure, the prohibited transmission and reception mode may correspond to a first power consumption mode, the periodic transmission and reception mode may correspond to a second power consumption mode, and the aperiodic on-demand transmission and reception mode may correspond to a third power consumption mode. The power consumption of the terminal in the first power consumption mode, the second power consumption mode and the third power consumption mode may decrease gradually.

In a possible embodiment of the present disclosure, the first configuration unit is further configured to: configure the power consumption mode of the terminal in accordance with measurement information reported by the terminal, the measurement information including a measurement value of a target signal; or randomly select one power consumption mode as the power consumption mode of the terminal; or configure the power consumption mode of the terminal in accordance with a configuration history of the power consumption mode of the terminal; or configure the power consumption mode of the terminal in accordance with transmission power of the base station; or configure the power consumption mode of the terminal in accordance with a service type of the terminal.

In a possible embodiment of the present disclosure, the first configuration unit is further configured to: receive measurement information reported by the terminal and configure the power-saving signal transmission and reception mode in accordance with the measurement information, the measurement information including a measurement value of a target signal; or configure the power-saving signal transmission and reception mode in accordance with a transmission and reception mode selected randomly; or configure the power-saving signal transmission and reception mode in accordance with a configuration history of the power-saving signal transmission and reception mode of the terminal; or configure the power-saving signal transmission and reception mode in accordance with transmission power of the base station; or configure the power-saving signal transmission and reception mode in accordance with a service type of the terminal.

In a possible embodiment of the present disclosure, the base station may further include a second configuration unit configured to configure a wake-up region for the terminal, and the transmission unit is further configured to transmit the power-saving signal in accordance with the power-saving mode of the terminal and the wake-up region.

In a possible embodiment of the present disclosure, the second configuration unit is further configured to: receive measurement information reported by the terminal and configure the wake-up region for the terminal in accordance with the measurement information, the measurement information including a measurement value of a target signal; or configure the wake-up region for the terminal in accordance with a wake-up region randomly selected; or configure the wake-up region for the terminal in accordance with a configuration history of the wake-up region for the terminal; or configure the wake-up region for the terminal in accordance with transmission power of the base station.

Based on the above method, the present disclosure further provides in some embodiments a device for implementing the above-mentioned reception method.

Figure 8:
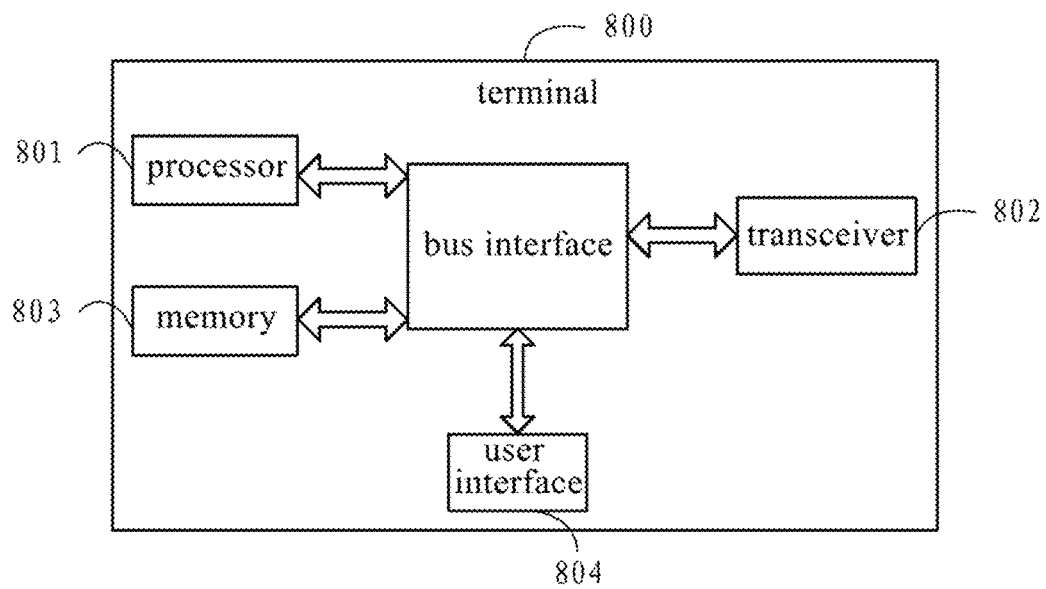
FIG. 8 is a schematic view showing a terminal according to one embodiment of the present disclosure.

As shown in FIG. 8, the present disclosure provides in some embodiments a terminal 800, which includes a processor 801, a transceiver 802, a memory 803, a user interface 804 and a bus interface.

In the embodiments of the present disclosure, the terminal 800 may further include a computer program stored in the memory 803 and executed by the processor 801.

The processor is configured to read the computer program stored in the memory, so as to configure a power-saving mode of the terminal, the power-saving mode including a power consumption mode and/or a power-saving signal transmission and reception mode of the terminal. The transceiver is configured to receive a power-saving signal from a base station in accordance with the power-saving mode of the terminal.

In FIG. 8, bus architecture may include a number of buses and bridges connected to each other, so as to connect various circuits for one or more processors 801 and one or more memories 803. In addition, as is known in the art, the bus architecture may be used to connect any other circuits, such as a circuit for a peripheral device, a circuit for a voltage stabilizer and a power management circuit. The bus interface may be provided, and the transceiver 802 may consist of a plurality of elements, i.e., a transmitter and a receiver for communication with any other devices over a transmission medium. With respect to different terminals, the user interface 804 may also be provided for devices which are to be arranged inside or outside the terminal, and these devices may include but not limited to a keypad, a display, a speaker, a microphone and a joystick.

The processor 801 may take charge of managing the bus architecture as well as general processings. The memory 803 may store therein data for the operation of the processor 801.

In a possible embodiment of the present disclosure, the processor is further configured to configure a first power-saving mode of the terminal at a first time point. After configuring the first power-saving mode, the processor is further configured to configure a second power-saving mode of the terminal at a second time point, and the first power-saving mode may be different from the second power-saving mode.

In a possible embodiment of the present disclosure, the first time point and the second time point may each be a pre-agreed configuration time, or a static/semi-static configuration time, or a dynamic configuration time. The dynamic configuration may include a DCI dynamic indicator, or an RNTI-scrambled PDCCH dynamic indicator.

In a possible embodiment of the present disclosure, the power-saving signal transmission and reception mode may include at least one of a periodic transmission and reception mode, an aperiodic on-demand transmission and reception mode, and a prohibited transmission and reception mode.

In a possible embodiment of the present disclosure, when the power-saving mode merely includes the power consumption mode of the terminal, the transceiver is further configured to: determine the power-saving signal transmission and reception mode corresponding to the power consumption mode of the terminal; and receive the power-saving signal from the base station in accordance with the determined transmission and reception mode.

In a possible embodiment of the present disclosure, the prohibited transmission and reception mode may correspond to a first power consumption mode, the periodic transmission and reception mode may correspond to a second power consumption mode, and the aperiodic on-demand transmission and reception mode may correspond to a third power consumption mode. The power consumption of the terminal in the first power consumption mode, the second power consumption mode and the third power consumption mode may decrease gradually.

In a possible embodiment of the present disclosure, the processor is further configured to: receive configuration information about the power consumption mode of the terminal from the base station, and configure the power consumption mode of the terminal; or configure the power consumption mode of the terminal in accordance with measurement information, the measurement information including a measurement value of a target signal.

In a possible embodiment of the present disclosure, the processor is further configured to receive transmission and reception configuration information about the transmission and reception mode of the terminal from the base station, and configure the transmission and reception mode of the terminal in accordance with the transmission and reception configuration information.

In a possible embodiment of the present disclosure, the processor is further configured to configure a wake-up region for the terminal, and the transceiver is further configured to receive the power-saving signal in accordance with the power-saving mode of the terminal and the wake-up region.

In a possible embodiment of the present disclosure, the processor is further configured to: receive region configuration information about the wake-up region for the terminal from the base station, and configure the wake-up region in accordance with the region configuration information; or configure the wake-up region for the terminal in accordance with measurement information, the measurement information including a measurement value of a target signal.

Figure 9:
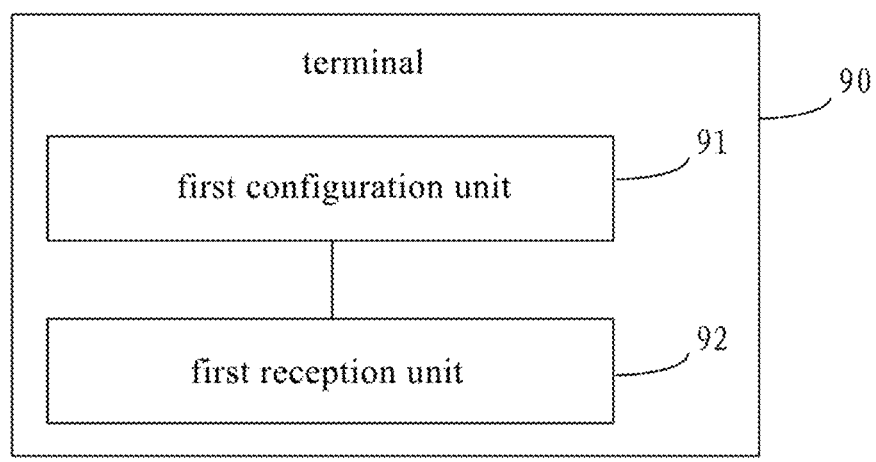
FIG. 9 is another schematic view showing the terminal according to one embodiment of the present disclosure.

As shown in FIG. 9, the present disclosure further provides in some embodiments a terminal 90, which includes: a first configuration unit 91 configured to configure a power-saving mode of the terminal, the power-saving mode including a power consumption mode and/or a power-saving signal transmission and reception mode of the terminal; and a reception unit 92 configured to receive a power-saving signal from a base station in accordance with the power-saving mode of the terminal.

In a possible embodiment of the present disclosure, the first configuration unit is further configured to configure a first power-saving mode of the terminal at a first time point. After configuring the first power-saving mode, the first configuration unit is further configured to configure a second power-saving mode of the terminal at a second time point, and the first power-saving mode may be different from the second power-saving mode.

In a possible embodiment of the present disclosure, the first time point and the second time point may each be a pre-agreed configuration time, or a static/semi-static configuration time, or a dynamic configuration time. The dynamic configuration may include a DCI dynamic indicator, or an RNTI-scrambled PDCCH dynamic indicator.

In a possible embodiment of the present disclosure, the power-saving signal transmission and reception mode may include at least one of a periodic transmission and reception mode, an aperiodic on-demand transmission and reception mode, and a prohibited transmission and reception mode.

In a possible embodiment of the present disclosure, when the power-saving mode merely includes the power consumption mode of the terminal, the reception unit is further configured to: determine the power-saving signal transmission and reception mode corresponding to the power consumption mode of the terminal; and receive the power-saving signal from the base station in accordance with the determined transmission and reception mode.

In a possible embodiment of the present disclosure, the prohibited transmission and reception mode may correspond to a first power consumption mode, the periodic transmission and reception mode may correspond to a second power consumption mode, and the aperiodic on-demand transmission and reception mode may correspond to a third power consumption mode. The power consumption of the terminal in the first power consumption mode, the second power consumption mode and the third power consumption mode may decrease gradually.

In a possible embodiment of the present disclosure, the first configuration unit is further configured to: receive configuration information about the power consumption mode of the terminal from the base station, and configure the power consumption mode of the terminal; or configure the power consumption mode of the terminal in accordance with measurement information, the measurement information including a measurement value of a target signal.

In a possible embodiment of the present disclosure, the first configuration unit is further configured to receive transmission and reception configuration information about the transmission and reception mode of the terminal from the base station, and configure the transmission and reception mode of the terminal in accordance with the transmission and reception configuration information.

In a possible embodiment of the present disclosure, the terminal may further include a second configuration unit configured to configure a wake-up region for the terminal, and the reception unit is further configured to receive the power-saving signal in accordance with the power-saving mode of the terminal and the wake-up region.

In a possible embodiment of the present disclosure, the second configuration unit is further configured to: receive region configuration information about the wake-up region for the terminal from the base station, and configure the wake-up region in accordance with the region configuration information; or configure the wake-up region for the terminal in accordance with measurement information, the measurement information including a measurement value of a target signal.

The present disclosure further provides in some embodiments a computer-readable storage medium storing therein instructions. The instructions are executed by a computer so as to implement the above-mentioned transmission method or reception method.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A power-saving signal transmission method, comprising:
   configuring, by a base station, a power-saving mode of a terminal, the power-saving mode comprising a power consumption mode and a power-saving signal transmission and reception mode of the terminal; and
   transmitting, by the base station, a power-saving signal to the terminal in accordance with the power-saving mode of the terminal,
   wherein the power consumption mode comprises a first power consumption mode, a second power consumption mode, and a third power consumption mode, the first power consumption mode being a power consumption mode when the terminal receives data normally, the second power consumption mode being a power consumption mode where the terminal receives the data in a low power consumption state, and the third power consumption mode being a power consumption mode where the terminal receives the data in lower power consumption state than the second power consumption mode; and
   wherein the power-saving signal transmission and reception mode comprises a first transmission and reception mode, a second transmission and reception mode, and a third transmission and reception mode, the first transmission and reception mode being a mode where a Wakeup Signal (WUS) is transmitted and received periodically, the second transmission and reception mode being a mode where the WUS is transmitted and received aperiodically in an on-demand manner, and the third transmission and reception mode being the WUS prohibited transmission and reception mode,
   wherein the first power consumption mode corresponds to the third transmission and reception mode, the second power consumption mode corresponds to the first transmission and reception mode, and the third power consumption mode corresponds to the second transmission and reception mode.

2. The power-saving signal transmission method according to claim 1, wherein the configuring, by the base station, the power-saving mode of the terminal comprises:
   configuring, by the base station, a first power-saving mode of the terminal at a first time point,
   wherein subsequent to configuring the first power-saving mode, the power-saving signal transmission method further comprises:
   configuring, by the base station, a second power-saving mode of the terminal at a second time point, and the first power-saving mode is different from the second power-saving mode.

3. The power-saving signal transmission method according to claim 2, wherein the first time point and the second time point are each a pre-agreed configuration time, or a static/semi-static configuration time, or a dynamic configuration time, wherein the dynamic configuration comprises a Downlink Control Indication (DCI) dynamic indicator, or a Radio Network Temporary Identity (RNTI)-scrambled Physical Downlink Control Channel (PDCCH) dynamic indicator.

4. The power-saving signal transmission method according to claim 1, wherein when the power-saving mode merely comprises the power consumption mode of the terminal, the transmitting, by the base station, the power-saving signal to the terminal in accordance with the power-saving mode of the terminal comprises:
   determining, by the base station, a power-saving signal transmission and reception mode corresponding to the power consumption mode of the terminal; and
   transmitting, by the base station, the power-saving signal to the terminal in accordance with the determined transmission and reception mode.

5. The power-saving signal transmission method according to claim 4, wherein the prohibited transmission and reception mode corresponds to a first power consumption mode, the periodic transmission and reception mode corresponds to a second power consumption mode, and the aperiodic on-demand transmission and reception mode corresponds to a third power consumption mode, wherein the power consumption of the terminal in the first power consumption mode, the second power consumption mode and the third power consumption mode decreases gradually.

6. The power-saving signal transmission method according to claim 1, wherein the configuring the power consumption mode of the terminal comprises:
   configuring, by the base station, the power consumption mode of the terminal in accordance with measurement information reported by the terminal, the measurement information comprising a measurement value of a target signal; or randomly selecting, by the base station, one power consumption mode as the power consumption mode of the terminal; or configuring, by the base station, the power consumption mode of the terminal in accordance with a configuration history of the power consumption mode of the terminal; or configuring, by the base station, the power consumption mode of the terminal in accordance with transmission power of the base station; or configuring, by the base station, the power consumption mode of the terminal in accordance with a service type of the terminal.

7. The power-saving signal transmission method according to claim 1, wherein the configuring the power-saving signal transmission and reception mode comprises:

receiving, by the base station, measurement information reported by the terminal and configuring the power-saving signal transmission and reception mode in accordance with the measurement information, the measurement information comprising a measurement value of a target signal; or configuring, by the base station, the power-saving signal transmission and reception mode in accordance with a transmission and reception mode selected randomly; or configuring, by the base station, the power-saving signal transmission and reception mode in accordance with a configuration history of the power-saving signal transmission and reception mode of the terminal; or configuring, by the base station, the power-saving signal transmission and reception mode in accordance with transmission power of the base station; or configuring, by the base station, the power-saving signal transmission and reception mode in accordance with a service type of the terminal.

8. The power-saving signal transmission method according to claim 1, further comprising:

configuring, by the base station, a wake-up region for the terminal, wherein the transmitting, by the base station, the power-saving signal to the terminal in accordance with the power-saving mode of the terminal comprises:

transmitting, by the base station, the power-saving signal in accordance with the power-saving mode of the terminal and the wake-up region, wherein the configuring, by the base station, the wake-up region for the terminal comprises:

receiving, by the base station, measurement information reported by the terminal and configuring the wake-up region for the terminal in accordance with the measurement information, the measurement information comprising a measurement value of a target signal; or configuring, by the base station, the wake-up region for the terminal in accordance with a wake-up region randomly selected; or configuring, by the base station, the wake-up region for the terminal in accordance with a configuration history of the wake-up region for the terminal; or configuring, by the base station, the wake-up region for the terminal in accordance with transmission power of the base station.

9. A power-saving signal reception method, comprising:

configuring, by a terminal, a power-saving mode of the terminal, the power-saving mode comprising a power consumption mode and a power-saving signal transmission and reception mode of the terminal; and receiving, by the terminal, a power-saving signal from a base station in accordance with the power-saving mode of the terminal, wherein the power consumption mode comprises a first power consumption mode, a second power consumption mode and a third power consumption mode, the first power consumption mode being a power consumption mode when the terminal receives data normally, the second power consumption mode being a power consumption mode where the terminal receives the data in a low power consumption state, and the third power consumption mode being a power consumption mode where the terminal receives the data in lower power consumption state than the second power consumption mode; and wherein the power-saving signal transmission and reception mode comprises a first transmission and reception mode, a second transmission and reception mode, and a third transmission and reception mode, the first transmission and reception mode being a mode where a Wakeup Signal (WUS) is transmitted and received periodically, the second transmission and reception mode being a mode where the WUS is transmitted and received aperiodically in an on-demand manner, and the third transmission and reception mode being the WUS prohibited transmission and reception mode, wherein the first power consumption mode corresponds to the third transmission and reception mode, the second power consumption mode corresponds to the first transmission and reception mode, and the third power consumption mode corresponds to the second transmission and reception mode.

10. The power-saving signal reception method according to claim 9, wherein the configuring, by the terminal, the power-saving mode of the terminal comprises:

configuring, by the terminal, a first power-saving mode of the terminal at the first time point, wherein subsequent to configuring the first power-saving mode, the power-saving signal reception method further comprises:

configuring, by the terminal, a second power-saving mode of the terminal at a second time point, and the first power-saving mode is different from the second power-saving mode.

11. The power-saving signal reception method according to claim 10, wherein the first time point and the second time point are each a pre-agreed configuration time, or a static/semi-static configuration time, or a dynamic configuration time, wherein the dynamic configuration comprises a DCI dynamic indicator, or an RNTI-scrambled PDCCH dynamic indicator.

12. The power-saving signal reception method according to claim 9, wherein when the power-saving mode merely comprises the power consumption mode of the terminal, the receiving, by the terminal, the power-saving signal from the base station in accordance with the power-saving mode of the terminal comprises:

determining, by the terminal, a power-saving signal transmission and reception mode corresponding to the power consumption mode of the terminal; and receiving, by the terminal, the power-saving signal from the base station in accordance with the determined transmission and reception mode.

13. The power-saving signal reception method according to claim 12, wherein the prohibited transmission and reception mode corresponds to a first power consumption mode, the periodic transmission and reception mode corresponds to a second power consumption mode, and the aperiodic on-demand transmission and reception mode corresponds to a third power consumption mode, wherein the power consumption of the terminal in the first power consumption mode, the second power consumption mode and the third power consumption mode decreases gradually.

14. The power-saving signal reception method according to claim 9, wherein the configuring the power consumption mode of the terminal comprises:
receiving, by the terminal, configuration information about the power consumption mode of the terminal from the base station, and configuring the power consumption mode of the terminal; or
configuring, by the terminal, the power consumption mode of the terminal in accordance with measurement information, the measurement information comprising a measurement value of a target signal.

15. The power-saving signal reception method according to claim 9, wherein the configuring the power-saving signal transmission and reception mode comprises:
receiving, by the terminal, transmission and reception configuration information about a transmission and reception mode of the terminal from the base station, and configuring the transmission and reception mode of the terminal in accordance with the transmission and reception configuration information.

16. The power-saving signal reception method according to claim 9, further comprising:
configuring, by the terminal, a wake-up region for the terminal,
wherein the receiving, by the terminal, the power-saving signal from the base station in accordance with the power-saving mode of the terminal comprises:
receiving, by the terminal, the power-saving signal in accordance with the power-saving mode of the terminal and the wake-up region,
wherein the configuring, by the terminal, the wake-up region for the terminal comprises:
receiving, by the terminal, region configuration information about the wake-up region for the terminal from the base station, and configuring the wake-up region in accordance with the region configuration information; or
configuring, by the terminal, the wake-up region for the terminal in accordance with measurement information, the measurement information comprising a measurement value of a target signal.

17. A base station, comprising: a transceiver, a memory, a processor, and a program stored in the memory and executed by the processor, wherein the processor is configured to read the program stored in the memory so as to configure a power-saving mode of a terminal, the power-saving mode comprising a power consumption mode and a power-saving signal transmission and reception mode of the terminal, wherein the transceiver is configured to transmit a power-saving signal to the terminal in accordance with the power-saving mode of the terminal,
wherein the power consumption mode comprises a first power consumption mode, a second power consumption mode, and a third power consumption mode, the first power consumption mode being a power consumption mode when the terminal receives data normally, the second power consumption mode being a power consumption mode where the terminal receives the data in a low power consumption state, and the third power consumption mode being a power consumption mode where the terminal receives the data in lower power consumption state than the second power consumption mode; and
wherein the power-saving signal transmission and reception mode comprises a first transmission and reception mode, a second transmission and reception mode, and a third transmission and reception mode, the first transmission and reception mode being a mode where a Wakeup Signal (WUS) is transmitted and received periodically, the second transmission and reception mode being a mode where the WUS is transmitted and received aperiodically in an on-demand manner, and the third transmission and reception mode being the WUS prohibited transmission and reception mode,
wherein the first power consumption mode corresponds to the third transmission and reception mode, the second power consumption mode corresponds to the first transmission and reception mode, and the third power consumption mode corresponds to the second transmission and reception mode.

18. The base station according to claim 17, wherein the processor is further configured to:
configure a first power-saving mode of the terminal at a first time point,
wherein subsequent to configuring the first power-saving mode, the processor is further configured to:
configure a second power-saving mode of the terminal at a second time point, the first power-saving mode being different from the second power-saving mode.

19. The base station according to claim 18, wherein the first time point and the second time point are each a pre-agreed configuration time, or a static/semi-static configuration time, or a dynamic configuration time, wherein the dynamic configuration comprises a Downlink Control Indication (DCI) dynamic indicator, or a Radio Network Temporary Identity (RNTI)-scrambled Physical Downlink Control Channel (PDCCH) dynamic indicator.

20. A terminal, comprising: a transceiver, a memory, a processor, and a computer program stored in the memory and executed by the processor, wherein the processor is configured to read the computer program stored in the memory so as to realize the power-saving signal reception method according to claim 9.

* * * * *